Patented Mar. 24, 1942

UNITED STATES PATENT OFFICE 2,277,486

2,277,486
METHOD FOR PRODUCING CELLULOSIC STRUCTURES

Rudolf Gewehr, Freiburg-in-Brisgau, Germany, assignor to E. I. du Pont de Nemours & Company, Wilmington, Del., a corporation of Delaware No Drawing. Application November 1, 1938, Serial No. 238,265. In Germany November 1, 1937.

6 Claims. (Cl. 18—54)

This invention relates to the manufacture of products comprised of organic derivatives of cellulose such as yarns, filaments, fibers, or the like, or fabrics made therefrom, and films, pellicles, caps, bands, and the like, which have an improved affinity for acid and/or direct dyestuffs.

Yarn and fabrics of organic derivatives of cellulose, for example, cellulose ethers such as ethyl cellulose or cellulose esters such as cellulose acetate, are generally non-receptive to acid dyestuffs which are commonly used to dye woolen fabrics. Such materials also have little or no affinity for direct dyestuffs which are commonly used to dye cotton or regenerated cellulose structures. It is, therefore, desirable that the dyeing affinity of organic derivatives of cellulose, such as cellulose acetate, be altered so as to be readily susceptible to dyeing with acid and direct dyestuffs.

Natural substances, such as casein, keratin, gelatin, albumin, and the like, have been incorporated in structures of organic derivatives of cellulose and to some extent such substances have improved the receptivity of such materials for acid and direct dyes. Since cellulose derivatives, such as cellulose acetate, are dissolved in organic solvents for the production of the above-described articles therefrom, it is very desirable that a dye modifying agent also be soluble in the said solvents. The various natural substances above mentioned, however, are not sufficiently soluble in these solutions to be readily and uniformly incorporated therein.

It has also been proposed to saponify, more or less, artificial products obtained from cellulose esters so as to make them receptive for direct dyes. However, such treatment deleteriously affects the physical properties of such artificial products, especially if the saponification treatment is carried far enough to substantially influence the affinity of this product for direct dyes.

It is, therefore, an object of this invention to increase the affinity for acid and direct dyestuffs of structures comprised of an organic compound having a high degree of polymerization, which structures do not have a satisfactory affinity for said dyestuffs.

More specifically, it is an object of this invention to provide modified cellulose derivatives which have good affinity for acid and direct dyes.

Another object of this invention is to provide a method of producing structures of cellulose derivatives so that satisfactory dyeing can be secured with acid or direct dyestuffs.

A further object is to produce cellulose acetate fibers, filaments, yarns, films, transparent wrapping tissue and the like, which have good affinity for acid and direct dyestuffs.

Other objects will be apparent from the description that follows.

The above objects are accomplished by incorporating aralkylated derivatives of natural products of high molecular weight which contain basic nitrogenous groups in the structures comprised of an organic compound having a high degree of polymerization. Since these compounds are readily soluble in the usual organic solvents for the cellulose derivatives, such dye modifying materials can be readily incorporated in the solution from which the filaments, yarns, films, or the like, are formed.

The aralkylated compounds above referred to, such as aralkylated derivatives of the proteins, casein, gelatin, albumin, vegetable albuminous products, and the protein-like deacetylated chitin or similar products, may be manufactured in accordance with the methods described in the literature. The term "proteinous" as used hereinafter is intended to include all of the above-mentioned protein and protein-like substances. These compounds are soluble in a number of organic solvents commonly used as solvents for organic derivatives of cellulose, although they are insoluble in water. These aralkylated products can be added in any proportion desired and in any manner desired.

The following examples are given to illustrate the principles of this invention, it being understood, of course, that the invention is not limited by these precise examples, which are merely illustrative of the invention.

Example I 24 grams of benzylated albumin is dissolved in 30 grams of acetone and mixed with 900 grams of a 24 per cent solution of cellulose acetate in acetone. This solution is spun according to the usual dry spinning process. Under the microscope, the yarn obtained has an entirely homogenous appearance and is dyed easily with wool dyes, e. g., Orange II (color index No. 151), or Alizarin Saphirol A3R (listed in Schultz "Farbstofftabellen," 1st supplement, 7th edition, 1934, as dye of unknown constitution).

A similar receptivity is obtained if, in place of cellulose ester, a cellulose ether is used; for example, if a 22 per cent solution of ethyl cellulose in methyl acetate with an addition of benzylated albumin is used.

Example II 9 grams of benzylated derivative of deacetylated chitin is dissolved in 36 grams of acetic acid and mixed with a solution of 171 grams of cellulose acetate in 610 grams of acetic acid. The solution is spun by the wet spinning process and the yarn obtained can be effectively dyed with the usual wool dyestuffs.

Example III

A film prepared from a polyvinyl acetate solution in acetone containing 10 per cent benzylated keratin is dyed to a full, deep color at 70° with a wool dye such as Orange II (color index No. 151), Alizarin Saphirol A3R, Supranol Red 2B, Azo Blue for wool SE, or Cyanol FFG (listed in Schultze "Farbstofftabellen," 1st supplement, 7th edition, 1934, as dyes of unknown constitution).

Example IV

A cellulose acetate yarn containing 15 per cent of the reaction product of casein with xylyl bromide, which yarn is produced according to the usual dry spinning process, possesses a high affinity for acid wool dyes.

As indicated above, these aralkylated products may be added in any proportion to the solution from which the artificial product is formed. It is preferred that the product contain amounts from about 5 per cent to 30 per cent, although more or less may at times be found desirable.

It has been found that the dyeing affinity of yarn, films, and other products, manufactured as explained above, can be increased still more by treatment with alkaline or saponifying agents, such as, for example, dilute solutions of alkali or alkali phosphate, alkali borate, or alkali silicate. This treatment can be carried out either during the formation of the products, or after they have been formed. Cellulose ester products to which these aralkylated natural azotized materials have been added have the advantage over a normal cellulose ester product that they can undergo this saponification treatment without harmful influence on their essential physical properties.

Example V 10 grams of cellulose acetate rayon staple, containing 10 per cent benzylated casein and prepared in accordance with Example I, is treated for one hour with 1000 cc. of an aqueous solution of 1 per cent sodium phosphate at a temperature of 80° C., washed, whizzed, and dried. The staple rayon can then be dyed with wool or direct dyes, and its physical properties will be substantially unaltered.

While the invention has been discussed primarily in terms of cellulose acetate, the invention is applicable to all organic derivatives of cellulose, such as cellulose propionate, cellulose butyrate, cellulose acetopropionate, cellulose acetostearate, or methyl, ethyl, glycol, benzyl cellulose, and the like. If desired, the cellulose derivative may be modified to contain besides the dye modifier titanium dioxide, or other inorganic and organic pigments, as well as plasticizers, waxes, and similar substances.

Although the present invention has particular reference to and has been particularly designed for the production of structures comprising organic derivatives of cellulose, it has been found that the dye modifying agents of this invention have considerable utility in improving the receptivity of all structures composed of organic compounds having a high degree of polymerization and which do not have a satisfactory affinity for acid and direct dyestuffs, for example, structures comprising resins and other synthetic polymers, for example, polyvinyl compounds such as polyvinyl acetate, interpolymers of vinyl chloride and vinyl acetate, chlorinated polyvinyl chloride, polymerized esters of acrylic or methacrylic acid, or the like.

By means of this invention, cellulose derivative products and the like may be produced which can be mixed with wool, cotton, or other natural fibers and dyed uniformly to a good depth with acid or direct dyes. Furthermore, cellulose derivative yarn or other structures produced in accordance with this invention may be effectively dyed with acid or direct dyestuffs.

Obviously many changes and modifications can be made in the above-described details without departing from the nature and spirit of the invention. It is, therefore, to be understood that the invention is not to be limited except as set forth in the appended claims.

I claim:

1. The process of increasing the affinity for acid and direct dyestuffs of structures spun from a textile filament-forming composition comprised of an organic compound having a high degree of polymerization, which structures do not have a satisfactory affinity for said dyestuffs, which comprises dissolving in said filament-forming composition an aralkylated member of the group consisting of naturally-occurring proteins and deacetylated chitin.

2. The process of increasing the affinity for acid and direct dyestuffs of structures spun from a textile filament-forming composition comprised of a cellulose organic derivative, which structures do not have a satisfactory affinity for said dyestuffs, which comprises dissolving in said filament-forming composition an aralkylated member of the group consisting of naturally-occurring proteins and deacetylated chitin.

3. The process of increasing the affinity for acid and direct dyestuffs of structures spun from a textile filament-forming composition comprised of cellulose acetate, which comprises dissolving in said filament-forming composition an aralkylated member of the group consisting of naturally-occurring proteins and deacetylated chitin.

4. The process of increasing the affinity for acid and direct dyestuffs of structures spun from a textile filament-forming composition comprised of an organic compound having a high degree of polymerization, which structures do not have a satisfactory affinity for said dyestuffs, which comprises dissolving in said filament-forming composition an aralkylated member of the group consisting of naturally-occurring proteins and deacetylated chitin, spinning said composition into filament structures, and treating said structures with an alkaline saponifying agent therefor.

5. The process of increasing the affinity for acid and direct dyestuffs of structures spun from a textile filament-forming composition comprised of a cellulose organic derivative, which structures do not have a satisfactory affinity for said dyestuffs, which comprises dissolving in said filament-forming composition an aralkylated member of the group consisting of naturally-occurring proteins and deacetylated chitin, spinning said composition into filament structures, and treating said structures with an alkaline saponifying agent therefor.

6. The process of increasing the affinity for acid and direct dyestuffs of structures spun from a textile filament-forming composition comprised of cellulose acetate, which comprises dissolving in said filament-forming composition an aralkylated member of the group consisting of naturally-occurring proteins and deacetylated chitin, spinning said composition into filament structures, and treating said structures with an alkaline saponifying agent therefor.

RUDOLF GEWEHR.